US 6,650,328 B1

(12) United States Patent
Hobbs et al.

(10) Patent No.: US 6,650,328 B1
(45) Date of Patent: Nov. 18, 2003

(54) SYSTEM AND METHOD FOR PLACING SPLINES USING REFINEMENT AND OBSTACLE AVOIDANCE TECHNIQUES

(75) Inventors: Craig Alan Hobbs, Bainbridge Island, WA (US); Scott Morgan Le Gendre, Bainbridge Island, WA (US); Richard David Fuhr, NE. Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 152 days.

(21) Appl. No.: 09/998,102

(22) Filed: Nov. 30, 2001

(51) Int. Cl.⁷ .............................................. G06T 11/20
(52) U.S. Cl. ...................................................... 345/442
(58) Field of Search ................................ 345/440, 441, 345/442

(56) References Cited

U.S. PATENT DOCUMENTS

| 4,953,106 A | * | 8/1990 | Gansner et al. ............. 345/441 |
| 5,594,855 A | * | 1/1997 | Von Her, II et al. ........ 345/442 |
| 6,483,509 B1 | * | 11/2002 | Rabenhorst ................. 345/442 |

* cited by examiner

*Primary Examiner*—Matthew Luu
(74) *Attorney, Agent, or Firm*—King & Spalding LLP

(57) ABSTRACT

A computer-implemented method and system for creating splines that can avoid certain objects on a page. The method improves upon existing drawing software modules by supporting the creation of curved connectors that connect only the intended source and target objects. Control points are used to control and manipulate the path of the spline in order to avoid intersecting undesired objects. Aesthetic refinement techniques enable the creation of splines with precise inflection points. The obstacle avoidance and refinement techniques produce more accurate drawings that are easier for the user to read.

20 Claims, 10 Drawing Sheets

Obstacle Avoidance Function (cont.)

Aesthetic Pre-Refinement

SYSTEM AND METHOD FOR PLACING SPLINES USING REFINEMENT AND OBSTACLE AVOIDANCE TECHNIQUES

RELATED APPLICATION

The present application Ser. No. 09/998,101 references and incorporates herein a related U.S. non-provisional application entitled System and Method for Efficiently Creating Splines, filed concurrently herewith.

TECHNICAL FIELD

The present invention is generally directed to a software module used for drawing diagrams. More specifically, the present invention provides a system and method for placing curves within an electronic version of a drawing using refinement and obstacle avoidance techniques.

BACKGROUND OF THE INVENTION

Computer software modules that enable users to produce drawings are widely available. These drawing software modules typically have functions that allow users to place and manipulate shapes and lines on a display screen to create a variety of drawings including pictures, charts, diagrams, and figures. After producing the drawings with the software module, users can store the drawings electronically, transmit them electronically, or print hard copies of the drawings.

One common use for drawing software modules is to create diagrams and flowcharts that represent structures and processes. The diagrams and flowcharts often consist of objects in the form of varying shapes that represent elements of a structure or steps in a process. The objects can be placed on the electronic "page" either automatically by a function within the software module or they can be "drawn" by a user with a pointing device such as a mouse. The objects on the electronic page can then be connected in a variety of ways to show how they are inter-related.

Traditionally, objects could be connected using a single, straight line or multiple, orthogonal line segments. The advantage of orthogonal line segments is that the paths of the connections could connect two objects while avoiding unwanted intersections with other objects on the page.

More recently, some commercially available drawing software modules enabled objects to be connected with curves or splines. A spline is generally defined as a smooth curve that actually or approximately connects a set of points, although it may not intersect all of the points. Typically, Bezier splines are used by drawing software modules to draw curves connecting shapes on an electronic page. A Bezier spline is a well-known type of curve generally defined by four points, often referred to as the control points, and a set of polynomial equations.

Although drawing software modules have the ability to draw curves, there are several limitations concerning the accuracy and precision with which the curves are placed on an electronic document. First, the curves drawn by conventional drawing software modules do not have the ability to avoid other objects on the page. That is, when a curve is drawn connecting a source object and a target object, it also may undesirably intersect other objects on the page. The inability to draw curves that automatically avoid other objects on the page results in garbled and confusing drawings. Second, the curves drawn by conventional drawing software modules can fail to show details in the path of the orthogonal line segments. For instance, when a short line segment is adjacent to a relatively long line segment, the conventional curve follows the general path of the orthogonal line segments. However, important details of the orthogonal line segment path can be lost in the conventional generalized curve.

In view of the foregoing, there is a need in the art for a method that will support the precise and accurate placement of curved connectors in an electronic drawing. Specifically, a need exists to be able to create drawings and flowcharts with curves that avoid intersecting unintended objects. A further need exists to be able to refine curves used in drawings so that they accurately capture the drafters intent.

SUMMARY OF THE INVENTION

The present invention is generally directed to a software module for placing smooth splines in an electronic diagram. The present invention improves upon existing drawing software modules which draw splines that may be inaccurate or intersect other objects on the page. Specifically, the present invention uses an obstacle-avoidance function to draw smooth splines that connect a source object and a target object without intersecting other objects on the page. The present invention also employs a refinement function to ensure that details of a path, represented by relatively smaller line segments, are reflected in the spline that is ultimately displayed.

In one aspect, the invention comprises a method for creating a spline using the obstacle avoidance function. The method includes connecting a source object and a target object on a page with orthogonal line segments. The drawing software module places initial control points along the orthogonal line segments and uses these control points to create a proposed spline connecting the source and target objects. A user can decide which types of obstacles on the page the proposed spline should not intersect. If the proposed spline does not intersect any of the designated obstacles, it can be displayed as the final spline. If the proposed spline does intersect user-designated obstacles, additional control points can be added to the initial control points and the proposed spline can be redrawn. This process can be repeated until the proposed spline does not intersect any designated obstacles or until it approximates the original orthogonal line segments.

The invention further provides a method for creating an accurate spline that shows the inflection points of the path between two objects. A software module manipulating an electronic diagram can connect a source object and a target object with orthogonal line segments and place initial control points along the line segments. In order to prevent loss of inflection details in the spline provided by relatively smaller line segments, the software module can compare the lengths of contiguous pairs of line segments. If the ratio of the lengths of the line segments is greater than a predetermined value, a refinement control point can be added to the longer line segment to ensure that that spline accurately traces the path of the orthogonal line segments. Once the refinement control point is added, the spline is placed using both the initial control points and the refinement control point.

In yet another aspect, the invention provides a computer-implemented method for creating smooth, accurate splines that incorporate both the refinement and obstacle avoidance features previously discussed. Typically, the refinement function is implemented first, so that a more accurate proposed spline is placed on the diagram. Then the obstacle avoidance function can be implemented until a spline is created that does not intersect designated obstacles.

These and other aspects of the invention will be described in the detailed description in connection with the drawing set and claim set.

DETAILED DESCRIPTION OF THE EXEMPLARY EMBODIMENTS

Figure 1:
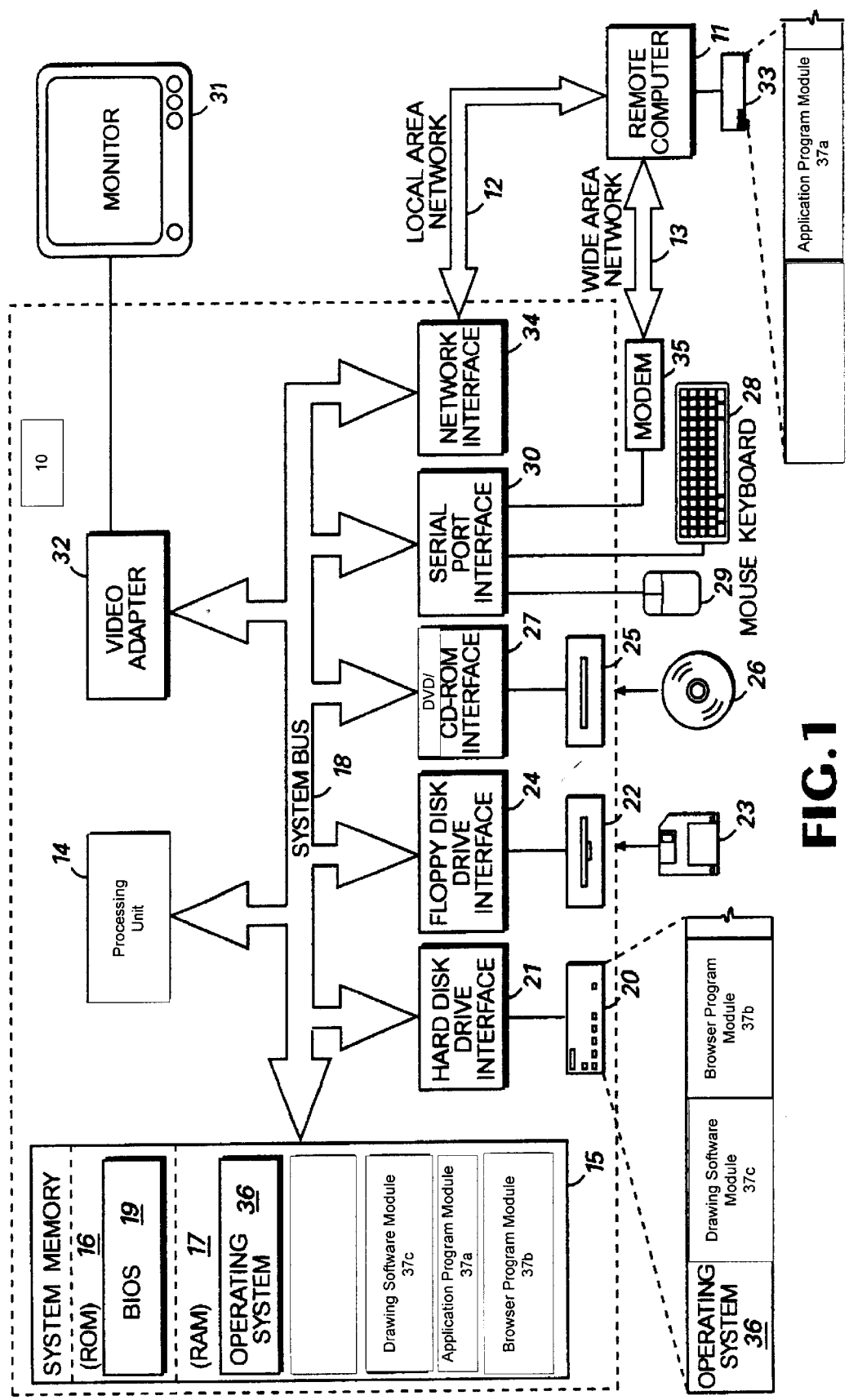
FIG. 1 is a functional block diagram illustrating the operating environment for an exemplary embodiment of the present invention.

The present invention enables users to create more precise diagrams and flow charts using curved lines as opposed to straight line segments. Specifically, the present invention utilizes aesthetic refinement and obstacle avoidance techniques to create more accurate and aesthetically pleasing splines. Conventional drawing software modules have relatively simple techniques for creating splines. The curves of conventional software modules often intersect unintended objects on the page and fail to follow the desired path. In contrast, the obstacle avoidance technique of the present invention supports the creation of splines that can link source and target objects without intersecting other objects. An aesthetic pre-refinement function enables the spline to more accurately trace the desired path. The combined effect of the refinement and obstacle avoidance techniques is to create diagrams that are more precise and easier to read.

Although the exemplary embodiments will be generally described in the context of a software module and an operating system running on a personal computer, those skilled in the art will recognize that the present invention also can be implemented in conjunction with other program modules for other types of computers. Furthermore, those skilled in the art will recognize that the present invention may be implemented in a stand-alone or in a distributed computing environment. In a distributed computing environment, program modules may be physically located in different local and remote memory storage devices. Execution of the program modules may occur locally in a stand-alone manner or remotely in a client/server manner. Examples of such distributed computing environments include local area networks of an office, enterprise-wide computer networks, and the global Internet.

The detailed description which follows is represented largely in terms of processes and symbolic representations of operations by conventional computer components, including processing units, memory storage devices, display devices and input devices. These processes and operations may utilize conventional computer components in a distributed computing environment, including remote file servers, remote computer servers, and remote memory storage devices. Each of these conventional distributed computing components is accessible by a processing unit via a communications network.

The processes and operations performed by the computer include the manipulation of signals by a processing unit or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

The present invention includes a computer program which embodies the functions described herein and illustrated in the appended flow charts. However, it should be apparent that there could be many different ways of implementing the invention in computer programming, and the invention should not be construed as limited to any one set of computer program instructions. Further, a skilled programmer would be able to write such a computer program to implement the disclosed invention without difficulty based on the flow charts and associated description in the application text, for example. Therefore, disclosure of a particular set of program code instructions is not considered necessary for an adequate understanding of how to make and use the invention. The inventive functionality of the claimed computer program will be explained in more detail in the following description in conjunction with the remaining figures illustrating the program flow.

Referring now to the drawings, in which like numerals represent like elements throughout the several figures, aspects of the present invention and the preferred operating environment will be described.

FIG. 1 illustrates various aspects of an exemplary computing environment in which the present invention is designed to operate. Those skilled in the art will appreciate that FIG. 1 and the associated discussion are intended to provide a brief, general description of the preferred computer hardware and program modules, and that additional information is readily available in the appropriate programming manuals, user's guides, and similar publications.

FIG. 1 illustrates a conventional personal computer 10 suitable for supporting the operation of the preferred embodiment of the present invention. As shown in FIG. 1, the personal computer 10 operates in a networked environment with logical connections to a remote server 11. The logical connections between the personal computer 10 and the remote server 11 are represented by a local area network 12 and a wide area network 13. Those of ordinary skill in the art will recognize that in this client/server configuration, the remote server 11 may function as a file server or computer server.

The personal computer 10 includes a processing unit 14, such as "PENTIUM" microprocessors manufactured by Intel Corporation of Santa Clara, Calif. The personal computer also includes system memory 15, including read only memory (ROM) 16 and random access memory (RAM) 17, which is connected to the processor 14 by a system bus 18. The preferred computer 10 utilizes a BIOS 19, which is stored in ROM 16. Those skilled in the art will recognize that the BIOS 19 is a set of basic routines that helps to transfer information between elements within the personal computer 10. Those skilled in the art will also appreciate that the present invention may be implemented on computers having other architectures, such as computers that do not use a BIOS, and those that utilize other microprocessors.

Within the personal computer 10, a local hard disk drive 20 is connected to the system bus 18 via a hard disk drive interface 21. A floppy disk drive 22, which is used to read or write a floppy disk 23, is connected to the system bus 18 via a floppy disk drive interface 24. A CD-ROM or DVD drive 25, which is used to read a CD-ROM or DVD disk 26, is connected to the system bus 18 via a CD-ROM or DVD interface 27. A user enters commands and information into the personal computer 10 by using input devices, such as a keyboard 28 and/or pointing device, such as a mouse 29, which are connected to the system bus 18 via a serial port interface 30. Other types of pointing devices (not shown in FIG. 1) include track pads, track balls, pens, head trackers, data gloves and other devices suitable for positioning a cursor on a computer monitor 31. The monitor 31 or other kind of display device is connected to the system bus 18 via a video adapter 32.

The remote server 11 in this networked environment is connected to a remote memory storage device. 33. This remote memory storage device 33 is typically a large capacity device such as a hard disk drive, CD-ROM or DVD drive, magneto-optical drive or the like. Those skilled in the art will understand that program modules, such as an application program module 37a, are provided to the remote server 11 via computer-readable media. The personal computer 10 is connected to the remote server 11 by a network interface 34, which is used to communicate over the local area network 12.

In an alternative embodiment, the personal computer 10 is also connected to the remote server 11 by a modem 35, which is used to communicate over the wide area network 13, such as the Internet. The modem 35 is connected to the system bus 18 via the serial port interface 30. The modem 35 also can be connected to the public switched telephone network (PSTN) or community antenna television (CATV) network. Although illustrated in FIG. 1 as external to the personal computer 10, those of ordinary skill in the art can recognize that the modem 35 may also be internal to the personal computer 10, thus communicating directly via the system bus 18. It is important to note that connection to the remote server 11 via both the local area network 12 and the wide area network 13 is not required, but merely illustrates alternative methods of providing a communication path between the personal computer 10 and the remote server 11.

Although other internal components of the personal computer 10 are not shown, those of ordinary skill in the art will appreciate that such components and the interconnection between them are well known. Accordingly, additional details concerning the internal construction of the personal computer 10 need not be disclosed in connection with the present invention.

Those skilled in the art will understand that program modules, such as an operating system 36, an application program module 37a, a browser program module 37b, a drawing software module 37c, and data are provided to the personal computer 10 via computer-readable media. In the preferred computer, the computer-readable media include the local or remote memory storage devices, which may include the local hard disk drive 20, floppy disk 23, CD-ROM or DVD 26, RAM 17, ROM 16, and the remote memory storage device 33. In the preferred personal computer 10, the local hard disk drive 20 is used to store data and programs.

Figure 2:
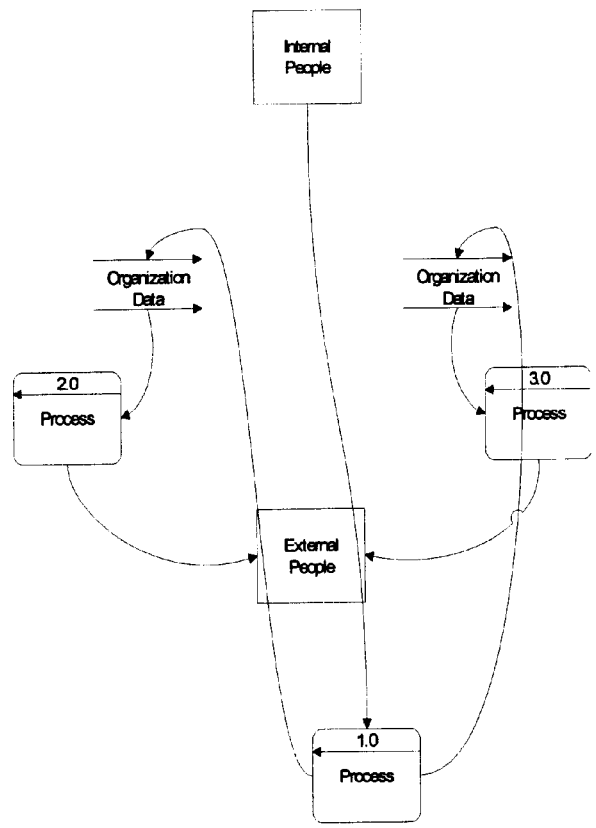
FIG. 2 is an exemplary diagram illustrating the limitations of conventional drawing software modules that cannot draw splines which avoid other objects on the page.
Figure 3:
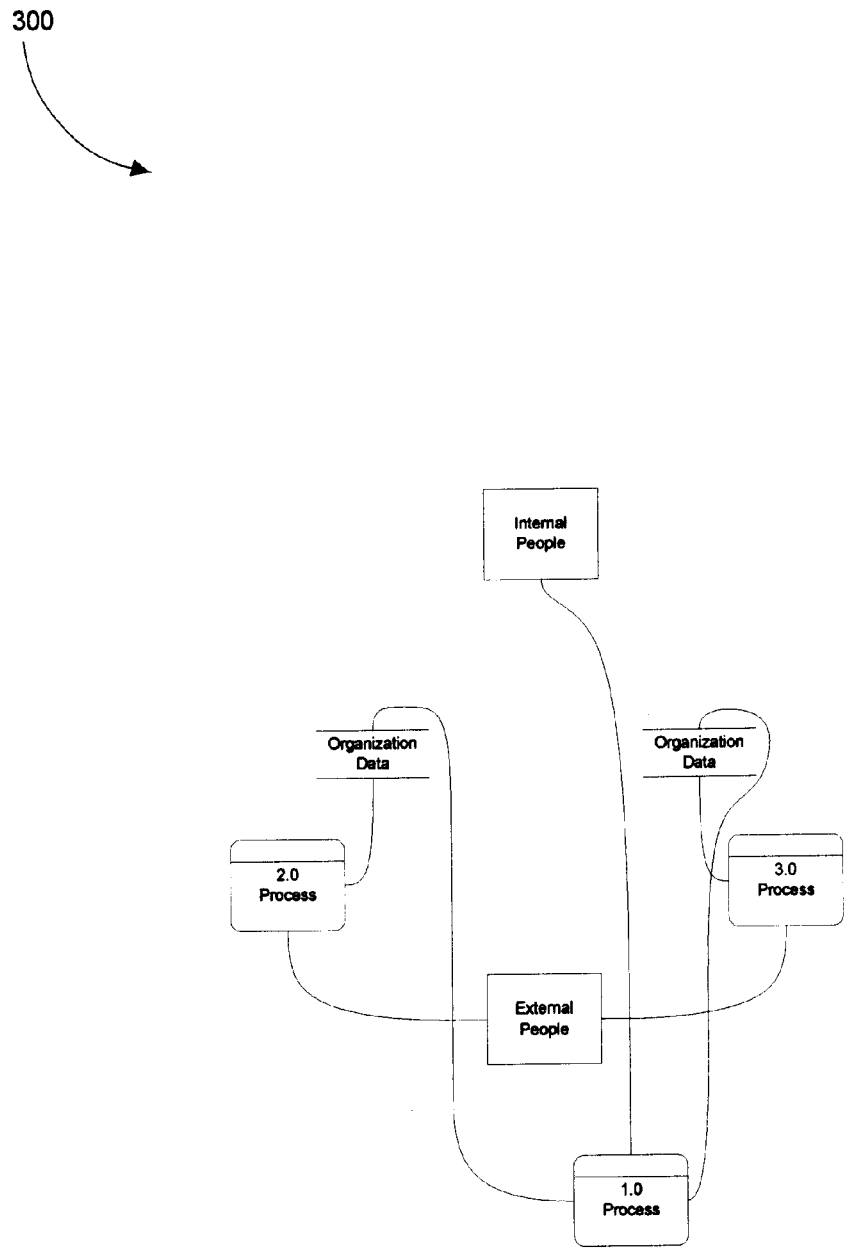
FIG. 3 is an exemplary diagram illustrating a flow chart created using refinement and obstacle avoidance techniques as described herein.

Referring to FIG. 2, an exemplary illustration 200 of a flow chart diagram created with a conventional drawing software module is shown. This illustration 200 is intended to highlight the limitations with drawing software modules that do not employ obstacle avoidance or refinement techniques. As FIG. 2 clearly shows, several of the splines connecting source and target objects also intersect intermediate objects along their paths. In contrast, FIG. 3 is an exemplary illustration 300 of a similar flow chart created using the obstacle avoidance and refinement techniques of the present invention. The curves of FIG. 3 connect source and target objects while navigating around intermediate objects. The result is to produce a more clear flow chart with fewer unintended and distracting intersections. Furthermore, the refinement technique enables the creation of curves with more precise inflection points as opposed to the generalized curves of FIG. 2.

Figure 4:
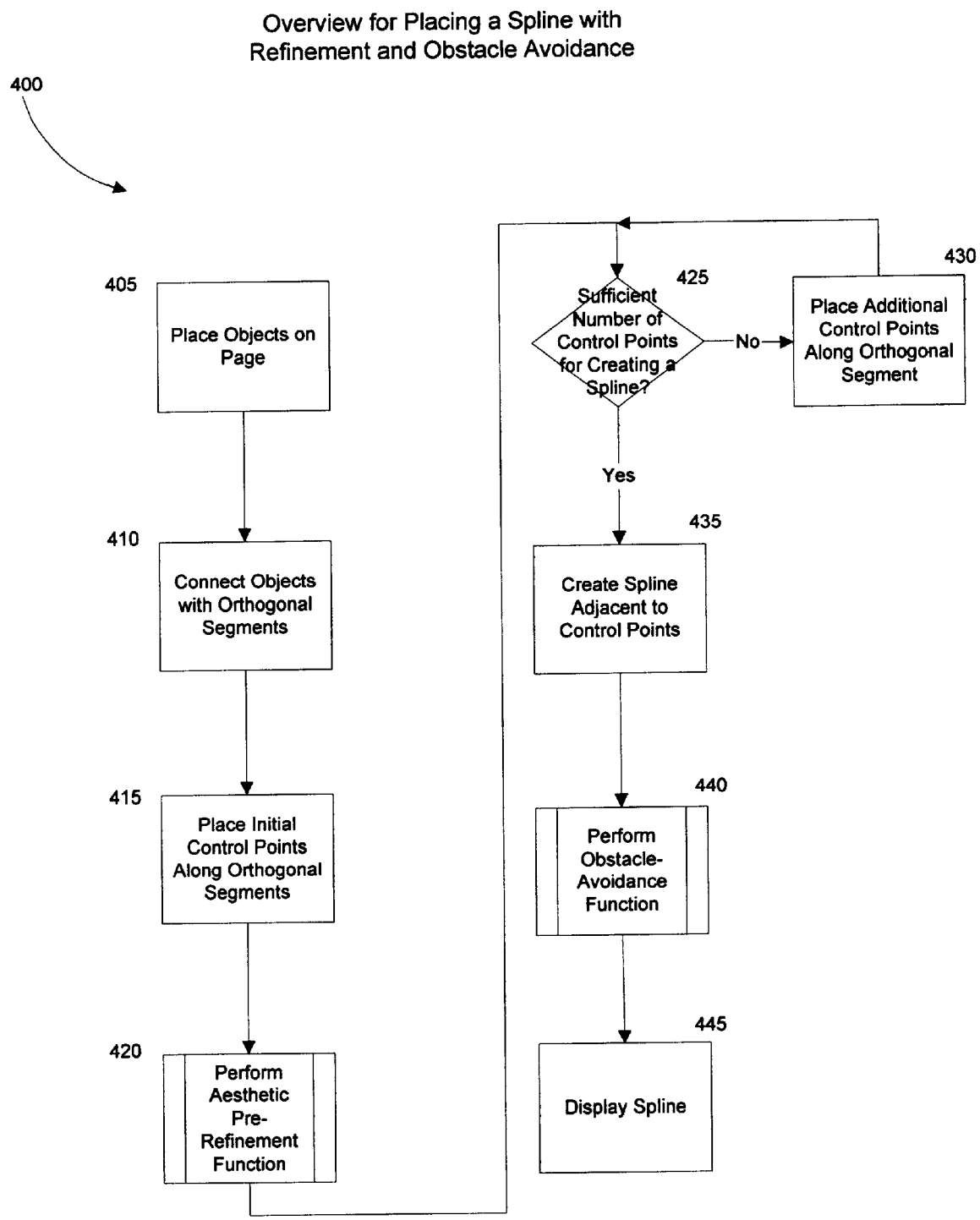
FIG. 4 is a logic flow diagram illustrating an overview of an exemplary process for drawing splines using refinement and obstacle avoidance techniques.

Referring to FIG. 4, an exemplary process 400 is illustrated for placing a spline on a page with obstacle avoidance and refinement techniques. In step 405, objects are placed on the electronic page. Typically, these are objects selected by a user from a template within the drawing software module or they are drawn by the user. In step 410, the user selects a type of connector to connect two of the objects, usually referred to as the source object and the target object. Typically, objects are connected using orthogonal line segments or a spline. If the user chooses to connect the objects with a spline, the drawing software module 37c will first connect the objects with orthogonal line segments, which will be used to create the spline. In step 415, the drawing software module 37c creates initial control points along the orthogonal line segments. Control points are typically placed at the end points of each orthogonal line segment and at one additional point along the orthogonal line segment. The coordinates of the control points are used to create the spline. Although there are different types of splines, the mathematical equations that define the different splines are well known. The splines typically used in drawing software modules are defined by third-degree polynomial equations which require coordinates from at least four points in order to create the spline. Alternative embodiments of the invention may use other splines defined by more complex equations.

In step 420, the drawing software module 37c automatically performs an aesthetic pre-refinement function. Conventional drawing software modules tend to create curves that traverse the simplest curved path between the source and target object. In contrast, the objective of the aesthetic pre-refinement function is to create curves with more precise inflection points. An exemplary process for performing an aesthetic pre-refinement function is illustrated in greater detail in FIG. 5. In step 425, the drawing software module 37c determines whether there are a sufficient number of control points for creating the spline. The order of the equations describing the spline determines the number of control points that are necessary. Because drawing software modules typically draw splines defined by third-degree polynomial equations, at least four control points are required. If there is an insufficient number of control points, additional control points are added in step 430.

In step 435, the drawing software module 37c creates the spline on the electronic page using the control points and the corresponding mathematical equations that define the particular spline. In the exemplary embodiment described herein, the spline is created from an array of control points and an array of knots. The knots are values describing the distances between the control points. In the present embodiment, knots are defined as:

$K=0$ where $0<=i<=$Degree and $K_i=K_{i-1}+\text{dist}(\text{avg}(C_{i-Degree-1} \ldots C_{i-1}), \text{avg}(C_{i-Degree} \ldots C_i))$
Degree$<i<N$ In the foregoing expression, N is the number of control points and Degree is the degree of the equations describing spline. The "avg" function computes the numerical average of points in a sequence and the "dist" function computes the distance between two points. Although implementing the knots array is not required to practice the invention, it produces more aesthetically pleasing splines.

Once the proposed spline is created, the drawing software module 37c performs the obstacle avoidance function as illustrated by step 440. An exemplary process for performing the obstacle avoidance function is illustrated in greater detail in FIG. 6A and FIG. 6B. As will be discussed in greater detail below, if the proposed spline does not intersect any other objects on the page, the obstacle avoidance function will not need to create additional splines with alternative paths. Finally, in step 445, the drawing software module 37c will display the spline on the electronic page connecting the two objects. The process 400 illustrated in FIG. 4 is merely an example. In an alternative embodiment of the invention, the steps of process 400 may be performed in a different order and some may be skipped entirely. For example, the aesthetic pre-refinement function is not necessary to achieve obstacle avoidance, but merely provides a spline with more accurate inflection points.

Figure 5:
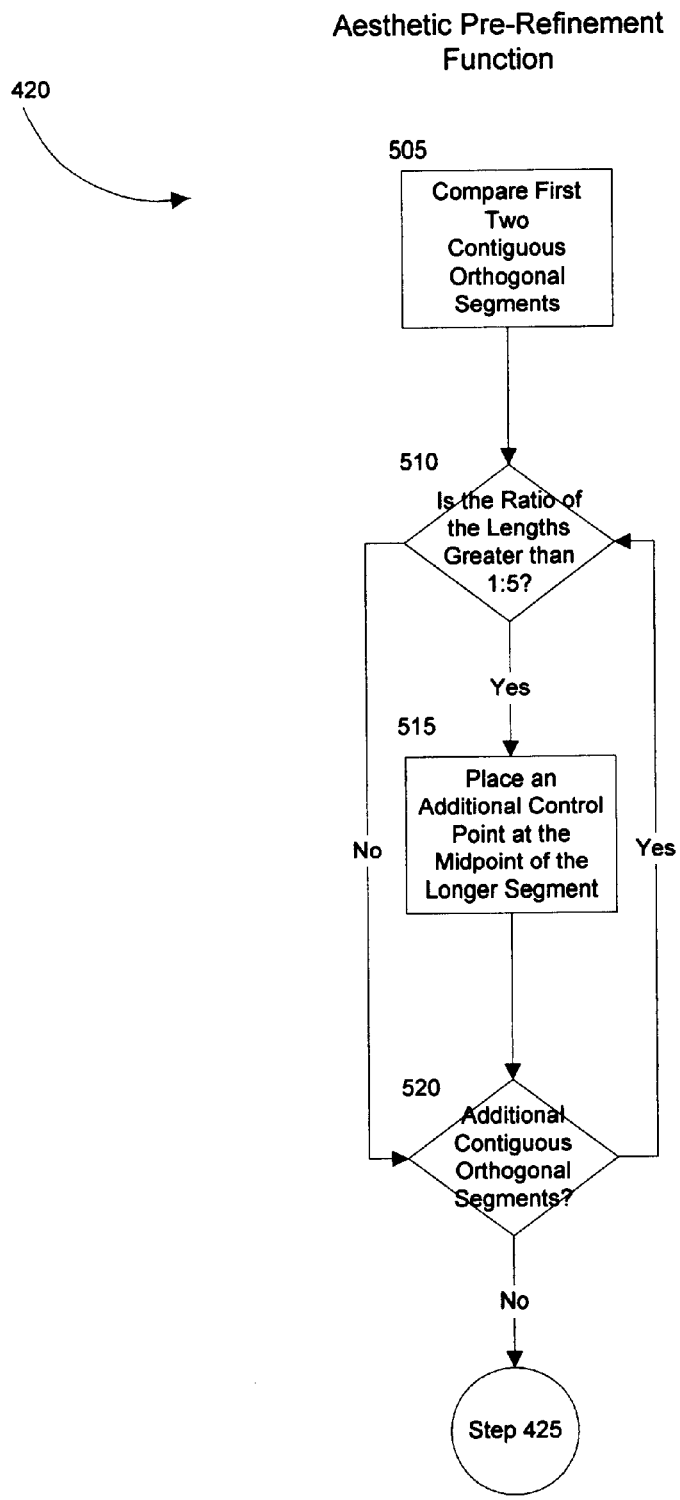
FIG. 5 is a logic flow diagram illustrating an exemplary process for creating splines with an aesthetic pre-refinement function.

FIG. 5 illustrates in greater detail an exemplary process 420, for performing an aesthetic pre-refinement function. In step 505. of FIG. 5, the drawing software module 37c will compare the first two contiguous orthogonal line segments connecting the two objects. In step 510, if the ratio of the lengths of the two lines is greater than 1:5, the drawing software module 37c places an additional control point at the midpoint of the longer segment in step 515. The 1:5 ratio is an arbitrary relationship and other ratios can be selected to create splines with different characteristics. The effect of the pre-refinement function is to pull the spline closer to the control point, forcing it to more accurately trace the path of the orthogonal line segments. By tracing the path of the line segments more closely, the spline will have more well-defined inflection points. Although the pre-refinement function is shown as occurring once, in alternative embodiments of the invention the process can place multiple additional control points along a single line segment.

In step 520, if there are additional orthogonal line segments connecting the two objects, their lengths will be compared, in step 510, to determine whether additional control points are necessary. If there are no additional orthogonal line segments to compare, the process returns to step 425 of FIG. 4. The aesthetic pre-refinement process 420 is a feature that can be selected by users when they wish for the spline to more closely trace the path of the orthogonal line segment. Alternatively, a user may choose not to invoke this function to achieve a different effect.

Figure 7:
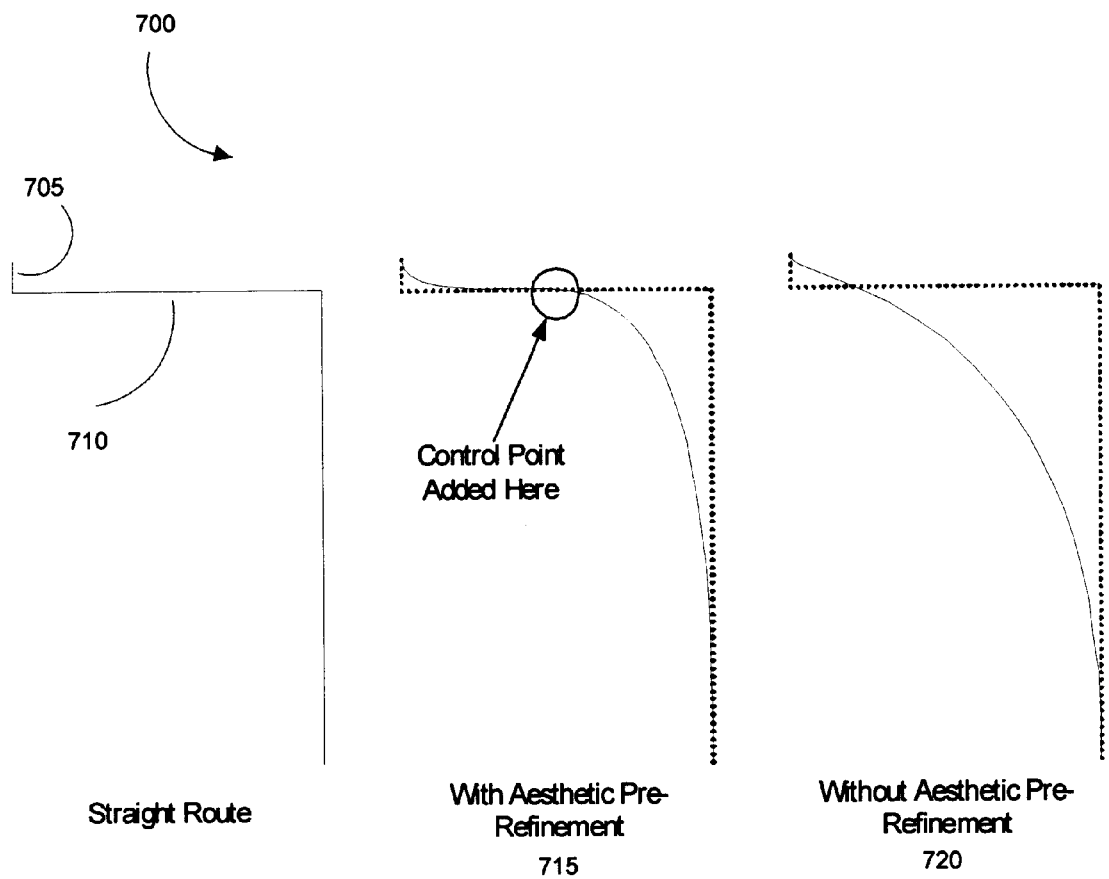
FIG. 7 is an comparison showing the effect of an exemplary aesthetic pre-refinement process on the path of a spline.

FIG. 7 provides an exemplary comparison 700 of a curve drawn without the aesthetic pre-refinement function 720 and one drawn with the aesthetic pre-refinement function 715. In the example shown in FIG. 7, line segment 710 is more than five times longer than line segment 705. In the drawing shown in 715, the control point added to line segment 710 pulls the path of the spline closer to the line segment. Adding the control point in drawing 715 has the effect of highlighting the inflection point between line segment 705 and 710. In contrast, no control point was added to drawing 720 and the curve barely shows any inflection point. The comparison shown in FIG. 7 illustrates the importance of the aesthetic pre-refinement function.

Figure 6A:
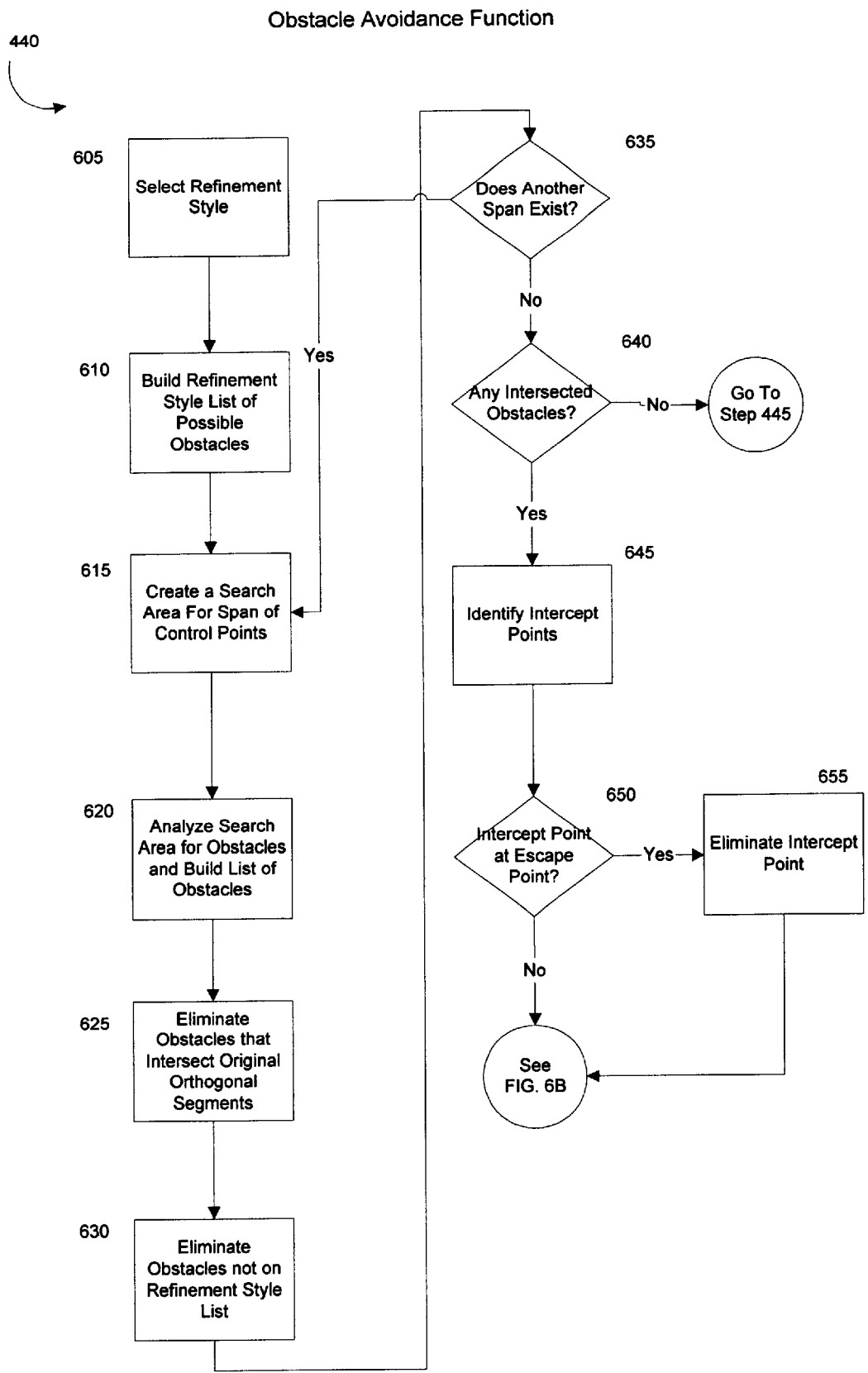
FIGS. 6A and 6B are logic flow diagrams illustrating an exemplary process for creating splines using an obstacle avoidance function.
Figure 6B:
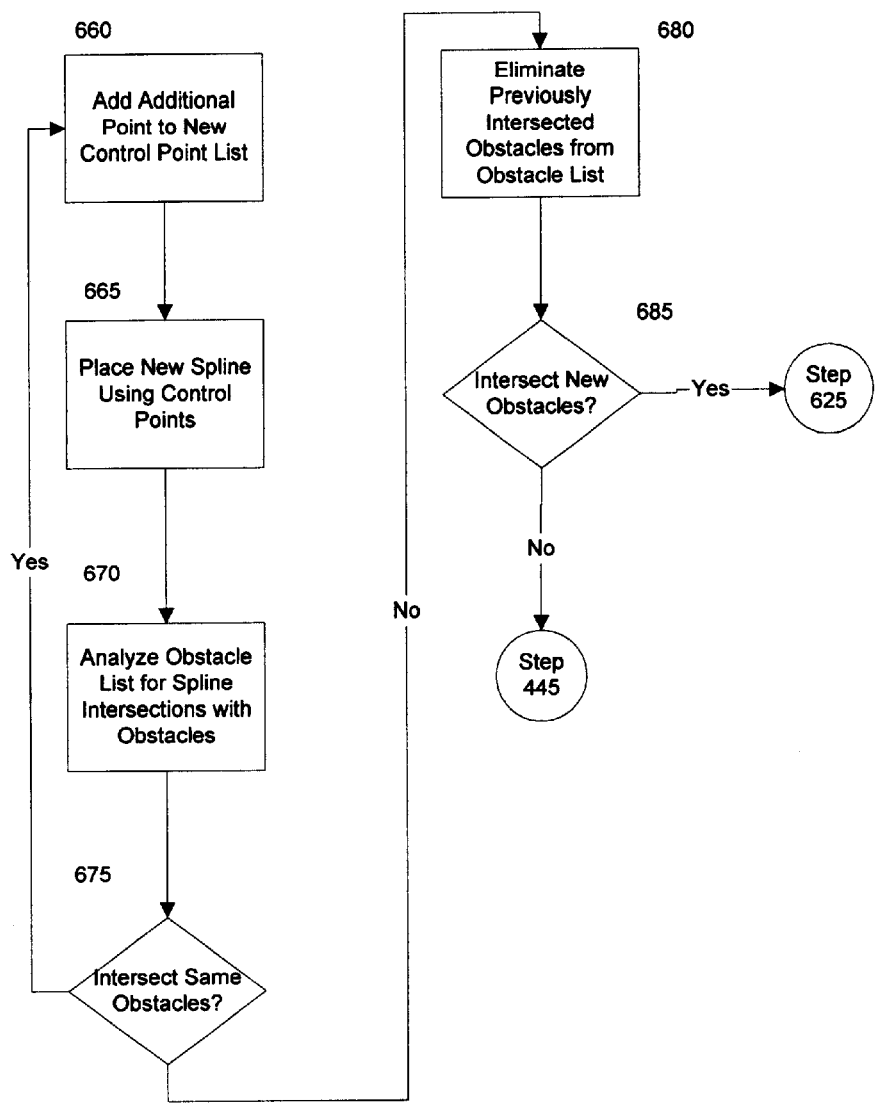
Figure 8:
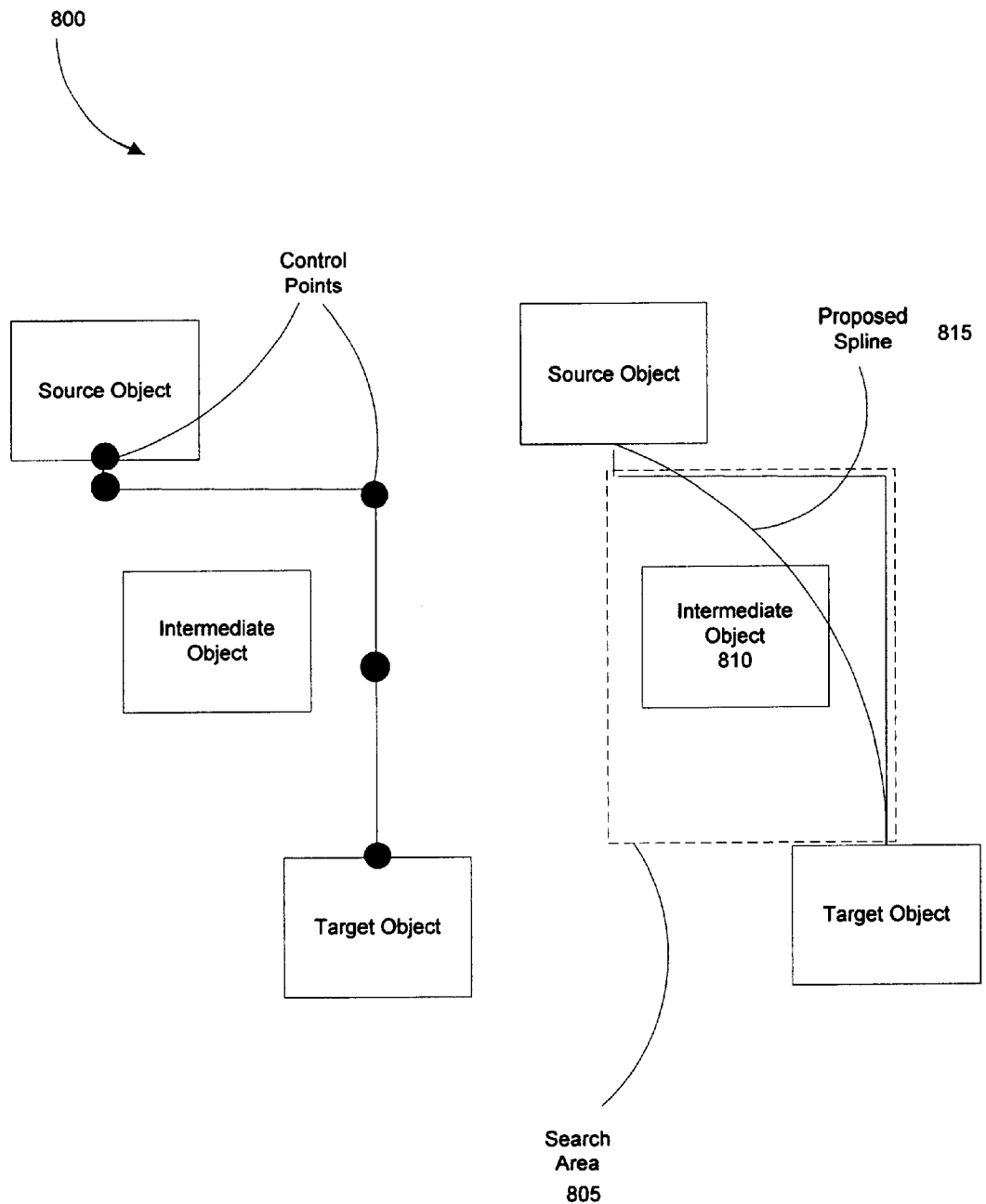
FIG. 8 is an exemplary illustration of a search area created to locate points where the proposed spline intersects with intermediate objects on the page.

FIG. 6A and FIG. 6B illustrate an exemplary process 440 for performing the obstacle avoidance function. The obstacle avoidance function allows for the placement of splines connecting objects that will not intersect other objects on the page. In step 605, the user can select a refinement style. The refinement style defines which objects the obstacle avoidance function will avoid. For example, the user may want the spline to avoid intersecting all objects on the page. Alternatively, the user may only want the spline to avoid intersecting the source and target objects. Once a refinement style is selected, in step 610, the drawing software module 37c builds a refinement style list of possible obstacles on the page. In step 615, the drawing software module 37c creates a search area from a span of control points. A span of control points is typically defined as a sequence of control points equal to the degree of the polynomial the spline plus 1. Accordingly, third-degree equations have spans of four points. Practically, a span generally comprises two adjacent orthogonal line segments forming two sides of the search area. An example of a simple search area 805 is shown in FIG. 8. The search area encompasses an intermediate object 810 that is intersected by the proposed spline 815. A more complex curve defined by multiple orthogonal line segments may be divided into several search areas.

In step 620, the drawing software module 37c analyzes the search area for potential intermediate objects between the source and target objects that the proposed spline, placed in step 435, may intersect. The intermediate objects in the search area between the source and target objects are collected. In the exemplary embodiment described herein, the collected objects are maintained in a list. In some instances, where it is impossible to avoid an object on the page, the orthogonal line segments will intersect that object before the proposed spline is drawn. In those cases, the embodiment set forth in FIG. 6A will also not attempt to avoid these obstacles. Accordingly, in step 625, the drawing software module 37c eliminates obstacles intersected by the original orthogonal segments from the obstacle list. In step 630, obstacles that are not on the refinement style list, as chosen by the user, are also eliminated from the obstacle list. Alternative embodiments may not employ a refinement style list to eliminate obstacles.

Figure 9:
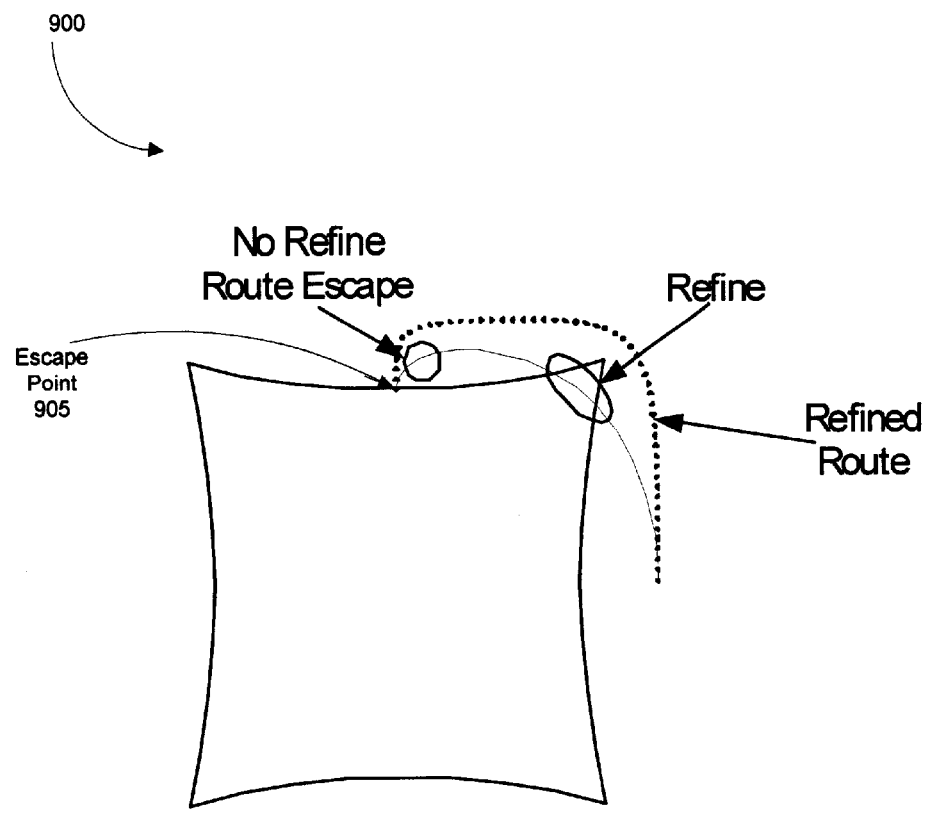
FIG. 9 is an exemplary illustration of an intersection point overlapping an escape point.

If the path connecting the source object and target object comprises more than one span, there will generally be additional search areas to be examined in step 635. For the case of additional spans, the process returns to step 615 and repeats until all spans have been examined for intersections. In step 640, if there are no further intersections of obstacles by the spline, the process proceeds to step 445 where the spline is displayed. If there are additional intersected obstacles, the "yes" branch is followed to step 645 where the intercept points of the proposed spline and the obstacles are identified. In step 650, the drawing software module must determine whether the intercept point is valid. If the intercept point is located at the escape point of the path from either the target or source object, it will be eliminated in step 655. As shown in FIG. 9, an intersection at the escape point 905 is generally the beginning or end of the connector path and thus, does not need to be avoided.

Continuing with step 660 on FIG. 6B, the drawing software module 37c adds control points to the pre-existing control points and creates a list of new control points. The control points are added to pull the spline away from the obstacle to avoid an intersection. Typically, a corresponding control point is placed between two existing control points that embrace an intersection. In some instances, the addition of control points creates redundant control points. An advantageous means of removing redundant control points is described in U.S. non-provisional patent application entitled System and Method for Efficiently Creating Splines, filed concurrently herewith, having Ser. No. 09/998,101 and also assigned to the Microsoft Corporation.

In step 665, the new spline is placed using the control points on the new control point list. In step 670, the obstacle list is examined again for points where the new spline intersects obstacles on the. page. If the same obstacles that were intersected during the first iteration are intersected in step 675, additional control points are added again in step 660. This process can be repeated numerous times until the spline avoids the intermediate objects or eventually approaches the path of the original orthogonal line segments. Alternatively, if the newly placed spline does not intersect the same obstacles in step 675, those obstacles can be eliminated from the obstacle list in step 680. In step 685, the drawing software module 37c looks to see whether the spline is intersecting any new obstacles. If new obstacles are intersected, the drawing software module will attempt to avoid these as well by returning to step 625 of FIG. 6A. If there are no new obstacles at step 685, the spline is displayed in step 445.

In conclusion, the present invention enables and supports the creation of drawings with curves that are more accurate and aesthetically pleasing. The present invention allows for the connection of source and target objects with a curve that can avoid other intermediate objects on the page. The present invention also utilizes an aesthetic refinement feature that can create curves with well-defined inflection points. These techniques can be used to create drawings and flow charts that are more clear for the user.

It will be appreciated that the present invention fulfills the needs of the prior art described herein and meets the above-stated objects. While there has been shown and described the preferred embodiment of the invention, it will be evident to those skilled in the art that various modifications and changes may be made thereto without departing from the spirit and the scope of the invention as set forth in the appended claims and equivalence thereof. For instance, various aspects of the present invention can be applied to other functions of drawing software modules to improve performance and precision. Although the improvements described herein are associated with drawing splines, they may also be applied to drawing other types of line segments and objects.

What is claimed is:

1. A method for creating a spline that connects a first object and a. second object and avoids intersecting other objects, comprising the steps of:
   connecting the first object and the second object with one or more line segments;
   placing initial control points along the one or more line segments;
   creating a proposed spline adjacent to the initial control points;
   analyzing whether the proposed spline intersects the first object, the second object, or the other objects,
   and if not,
      displaying the proposed spline;
   and if so,
      placing added control points along the one or more line segments,
      creating a revised spline adjacent to the initial control points and added control points,
      analyzing whether the revised spline intersects, the first object, the second object, or the other objects,
      and if so,
         repeating the previous three steps,
      and if not,
         displaying the revised spline.

2. The method of claim 1, further comprising the step of increasing the number of initial control points so that there are a sufficient number to create the proposed spline.

3. The method of claim 1, wherein the line segments are orthogonal.

4. The method of claim 1, wherein the step of analyzing whether the proposed spline intersects objects comprises creating a search area for a span of control points.

5. The method of claim 1, further comprising the step of ignoring a selected object intersected by the proposed spline, where the selected object intersects the one or more line segments.

6. The method of claim 1, further comprising the step of ignoring intersections with the first object and the second object where the proposed spline originates or terminates.

7. The method of claim 1, further comprising the step of performing a pre-refinement function to accurately show inflection points in the proposed spline.

8. The method of claim 1, further comprising the steps of:
   comparing a first line segment and a second line segment that are contiguous; and
   if the ratio of the length of the first line segment and the second line segment is greater than a predetermined value, placing an added control point at the midpoint of the second line segment.

9. A computer-readable medium having computer-executable instructions for performing the steps recited in claim 1.

10. A method for creating a spline that connects a first object and a second object and shows inflection points of the spline, comprising the steps of:
    connecting the first object and the second object with one or more line segments;
    placing control points along the one or more line segments;
    comparing a first line segment and a second line segment that are contiguous;
    if the ratio of the length of the first line segment and the second line segment is greater than a predetermined value, placing an added control point at the midpoint of the second line segment; and
    creating a spline adjacent to the control points.

11. The method of claim 10, further comprising the step of placing the first object and the second object on a page.

12. The method of claim 10, further comprising the step of selecting the first object and the second object.

13. The method of claim 10, further comprising the step of increasing the number of initial control points so that there are a sufficient number to create the spline.

14. A computer-readable medium having computer-executable instructions for performing the steps recited in claim 10.

15. A computer-implemented method for creating a curve that connects a first object and a second object in a diagram and avoids intersecting other objects in the diagram, comprising the steps of:

receiving the first object and the second object on a page;

connecting the first object and the second object with orthogonal line segments;

placing initial control points along the orthogonal line segments;

placing a proposed curve adjacent to the initial control points;

analyzing whether the proposed curve intersects other objects on the page and if not, displaying the proposed curve on the page; and if so, placing added control points along the orthogonal line segments, placing a revised curve adjacent to the initial control points and added control points, analyzing whether the revised curve intersects other objects on the page and if so, repeating the previous three steps, and if not, displaying the revised curve on the page.

16. The method of claim 15, further comprising the step of increasing the number of initial control points so that there are a sufficient number to create the proposed curve.

17. The method of claim 15, further comprising the step of ignoring a selected object intersected by the proposed curve.

18. The method of claim 15, further comprising the step of performing a pre-refinement function to accurately show inflection points in the proposed curve.

19. The method of claim 15, further comprising the steps of:

comparing a first line segment and a second line segment that are contiguous; and if the ratio of the length of the first line segment and the second line segment is greater than a predetermined value, placing an added control point at the midpoint of the second line segment.

20. A computer-readable medium having computer-executable instructions for performing the steps recited in claim 15.

* * * * *

UNITED STATES PATENT AND TRADEMARK OFFICE
CERTIFICATE OF CORRECTION

PATENT NO. : 6,650,328 B1  Page 1 of 1
DATED : November 18, 2003
INVENTOR(S) : Craig Alan Hobbs, Scott Morgan Le Gendre and Richard David Fuhr It is certified that error appears in the above-identified patent and that said Letters Patent is hereby corrected as shown below:

<u>Column 9,</u>
Line 60, "and a. second object" should read -- and a second object --

Signed and Sealed this

Thirteenth Day of January, 2004

JON W. DUDAS
*Acting Director of the United States Patent and Trademark Office*